(12) United States Patent
Yoshida et al.

(10) Patent No.: US 9,133,356 B2
(45) Date of Patent: Sep. 15, 2015

(54) AQUEOUS DISPERSION FOR INKJET PRINTING

(75) Inventors: Hiroyuki Yoshida, Wakayama (JP); Takahiro Sato, Wakayama (JP); Yusuke Shimizu, Wakayama (JP)

(73) Assignee: KAO CORPORATION, Tokyo (JP)

( * ) Notice: Subject to any disclaimer, the term of this patent is extended or adjusted under 35 U.S.C. 154(b) by 799 days.

(21) Appl. No.: 13/504,740

(22) PCT Filed: Oct. 9, 2010

(86) PCT No.: PCT/JP2010/067805
§ 371 (c)(1),
(2), (4) Date: Apr. 27, 2012

(87) PCT Pub. No.: WO2011/052365
PCT Pub. Date: May 5, 2011

(65) Prior Publication Data
US 2012/0219715 A1    Aug. 30, 2012

(30) Foreign Application Priority Data
Oct. 30, 2009   (JP) .................................. 2009-251182

(51) Int. Cl.
C09D 11/38     (2014.01)
C09D 7/02      (2006.01)
C09D 11/326    (2014.01)

(52) U.S. Cl.
CPC  C09D 11/38 (2013.01); C09D 7/02 (2013.01); C09D 11/326 (2013.01)

(58) Field of Classification Search
CPC .............................. C09D 11/38; C09D 11/326
See application file for complete search history.

(56) References Cited

U.S. PATENT DOCUMENTS

| 7,582,150 B2* | 9/2009 | Jaunky et al. ............. 106/31.52 |
| 2001/0023265 A1 | 9/2001 | Hidaka et al. |
| 2003/0140819 A1 | 7/2003 | Ishigami et al. |
| 2007/0128532 A1 | 6/2007 | Grimm et al. |
| 2007/0167616 A1 | 7/2007 | Luterbacher et al. |
| 2009/0087769 A1 | 4/2009 | Weber et al. |
| 2015/0004538 A1* | 1/2015 | Kawamura et al. ...... 430/108.22 |

FOREIGN PATENT DOCUMENTS

| CN | 1946808 A | 4/2007 |
| CN | 101175823 A | 5/2008 |
| GB | 2364322 A | 1/2002 |
| JP | 56-166266 A | 12/1981 |
| JP | 63-178169 A | 7/1988 |
| JP | 1-234470 A | 9/1989 |
| JP | 2-102272 A | 4/1990 |
| JP | 10-158555 A | 6/1998 |
| JP | 2000-169742 A | 6/2000 |
| JP | 2003-128952 A | 5/2003 |
| JP | 2003-165919 A | 6/2003 |
| JP | 2003-165920 A | 6/2003 |
| JP | 2005-48114 A | 2/2005 |
| JP | 2006-124584 A | 5/2006 |

OTHER PUBLICATIONS

Machine English translation for JP-10-158555-A dated Jun. 16, 1998.
Machine English translation for JP-2000-169742-A dated Jun. 20, 2000.
Machine English translation for JP-2003-128952-A dated May 8, 2003.
Machine English translation for JP-2005-048114-A dated Feb. 24, 2005.
Machine English translation for JP-2006-124584-A dated May 18, 2006.

* cited by examiner

*Primary Examiner* — Vickey Nerangis
(74) *Attorney, Agent, or Firm* — Birch, Stewart, Kolasch & Birch, LLP

(57) ABSTRACT

The invention relates to (1) a water dispersion for ink-jet printing including a polymer and a pigment mixture of C.I. Pigment Yellow 74 (A) and an azo compound (B) represented by the following formula (1) which is dispersed with the polymer, wherein a total pigment solid content of the components (A) and (B) in the water dispersion is from 15 to 35% by weight; and (2) a water-based ink for ink jet printing including a polymer and a pigment mixture of C.I. Pigment Yellow 74 (A) and the azo compound (B) which is dispersed with the polymer, wherein a total pigment solid content of the components (A) and (B) in the water-based ink is from 3 to 20% by weight,

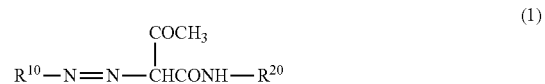

(1)

wherein $R^{10}$ and $R^{20}$ are independently an aryl group with the proviso that at least one of $R^{10}$ and $R^{20}$ has a sulfonic acid group and a sulfonic acid amide group.

20 Claims, No Drawings

AQUEOUS DISPERSION FOR INKJET PRINTING

FIELD OF THE INVENTION

The present invention relates to water dispersions and water-based inks for ink-jet printing using Pigment Yellow 74, which are excellent in optical density and storage stability.

BACKGROUND OF THE INVENTION

In ink-jet printing methods, droplets of ink are directly projected onto a recording medium from very fine nozzles and allowed to adhere to the recording medium to form characters and images. The ink-jet printing methods have been rapidly spread because of their various advantages such as easiness of full coloration, low costs, capability of using a plain paper as the recording medium, non-contact with printed images and characters, etc. Among them, pigment-based inks have now become leading from the viewpoints of light fastness and water resistance of printed characters or images, and suitably used in ink-jet printers for domestic use.

In recent years, ink-jet printers have been extensively used in domestic applications, office applications and commercial printing applications, and there is a current tendency that these ink-jet printers are of a high-speed printing type. For this reason, there have been adopted the method of increasing a capacity of each ink droplet, and the method of improving a printing head, etc., to reduce a printing frequency and increase a printing speed.

In the high-speed printing method which is incapable of dual or triple overprinting unlike the conventional printing methods, there is a demand for inks which are capable of producing printed images or characters having a high optical density only by one printing operation.

C.I. Pigment Yellow 74 (hereinafter occasionally referred to as merely "PY-74") is a pigment having an excellent color developability, but has such a problem that the color developability becomes insufficient when used for high-speed printing, e.g., in business applications. In consequence, there have been proposed improvements in properties of PY-74 itself, and improvements in optical density, etc., of inks containing yellow pigments such as PY-74 derivatives, etc.

For example, JP 2000-169742A aims at providing an offset yellow ink having good transparency, concentration and fluidity, and discloses a printing ink composition which includes a disazo pigment obtained by mixing and coupling a tetrazotized dichlorobenzidine as a diazo component, acetoaceto-ortho-toluidide, acetoaceto-metaxylidide, an acid group-containing acetoacetanilide and a basic group-containing acetoacetanilide with each other, and a printing ink vehicle.

JP 2005-048114A aims at providing a pigment composition for color image recording which is excellent in balance between image reproducibility and image retention property, and discloses the pigment composition for color image recording which includes a yellow-based pigment or the like, and a pigment derivative containing a residue of the yellow-based pigment or the like.

JP 2003-165919A aims at providing a printing ink which is excellent in transparency and concentration, and discloses PY-74 which is produced by subjecting a coupler component containing a specific acetoacetanilide derivative and a diazo component obtained by diazotizing 2-methoxy-4-nitroaniline to coupling reaction.

JP 2003-165920A aims at providing a printing ink which is excellent in transparency and concentration, and discloses PY-74 which is produced by subjecting a coupler component containing 2-methoxyacetoacetanilide and a diazo component obtained by diazotizing an aniline derivative to coupling reaction.

JP 2006-124584A aims at providing a water-based ink for ink-jet printing which is capable of satisfying a high optical density when printed on a plain paper therewith and achieving an excellent gloss when printed on a coated paper therewith, and discloses a water dispersion and a water-based ink for ink-jet printing including water-insoluble vinyl polymer particles containing a yellow organic pigment such as PY-74 and a specific azo compound in which the water-insoluble vinyl polymer contains a constitutional unit derived from benzyl methacrylate, etc.

SUMMARY OF THE INVENTION

The present invention relates to the following water dispersion (1) and water-based ink (2).

(1) A water dispersion for ink-jet printing including a polymer and a pigment mixture of C.I. Pigment Yellow 74 (A) and an azo compound (B) represented by the following formula (1) which is dispersed with the polymer, wherein a total pigment solid content of the components (A) and (B) in the water dispersion is from 15 to 35% by weight,

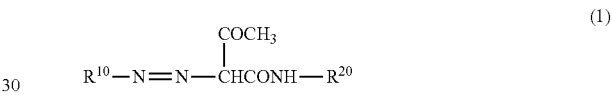

wherein $R^{10}$ and $R^{20}$ are each independently an aryl group with the proviso that at least one of $R^{10}$ and $R^{20}$ has a sulfonic acid group and a sulfonic acid amide group.

(2) A water-based ink for ink-jet printing including a polymer and a pigment mixture of C.I. Pigment Yellow 74 (A) and an azo compound (B) represented by the above formula (1) which is dispersed with the polymer, wherein a total pigment solid content of the components (A) and (B) in the water-based ink is from 3 to 20% by weight.

DETAILED DESCRIPTION OF THE INVENTION

The present invention relates to a water dispersion and a water-based ink for ink-jet printing which have a high optical density adaptable for high-speed printing, an excellent storage stability, a reduced viscosity when formed into inks, and a less change in absorption characteristics.

Conventional water-based inks using PY-74 only as a pigment exhibit a low optical density and therefore have been unsuitable for high-speed printing. In addition, the inks using PY-74 and the pigment derivative have been improved in their optical density to some extent, but have still failed to exhibit a sufficient storage stability. In particular, it is required that inks having a high pigment content which are adaptable for high-speed printing are further improved in storage stability.

The present inventors have found that water-based inks containing a pigment derivative having a PY-74 skeleton containing a sulfonamide group and a sulfonic acid group have a high optical density when printed therewith, and an excellent storage stability even when they have a high solid content, and are capable of provide inks having a reduced viscosity and therefore an excellent ejection property and exhibiting a less change in absorption characteristics. The reason therefor is considered as follows. That is, it is considered that since the sulfonamide group has a higher hydrophobic property than that of the coexisting sulfonic acid group, the pigment derivative having the PY-74 skeleton containing the sulfonamide group and the sulfonic acid group allows the PY-74 pigment to be finely dispersed in water, and at the same time, the pigment derivative can be prevented from being detached from the PY-74 and dissolved therein during the storage.

Thus, the present invention relates to the following water dispersion (1) and water-based ink (2).

(1) A water dispersion for ink-jet printing including a polymer and a pigment mixture of C.I. Pigment Yellow 74 (A) and an azo compound (B) represented by the following formula (1) which is dispersed with the polymer, wherein a total pigment solid content of the components (A) and (B) in the water dispersion is from 15 to 35% by weight,

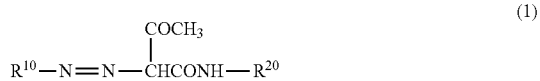

wherein $R^{10}$ and $R^{20}$ are each independently an aryl group which may have a substituent group selected from the group consisting of a methoxy group and a nitro group with the proviso that at least one of $R^{10}$ and $R^{20}$ has a sulfonic acid group and a sulfonic acid amide group.

(2) A water-based ink for ink-jet printing including a polymer and a pigment mixture of C.I. Pigment Yellow 74 (A) and an azo compound (B) represented by the above formula (1) which is dispersed with the polymer, wherein a total pigment solid content of the components (A) and (B) in the water-based ink is from 3 to 20% by weight.

In the followings, the respective components, etc., which are used in the present invention are explained.

<C.I. Pigment Yellow 74 (A)>

Examples of the C.I. Pigment Yellow 74 (A) (hereinafter occasionally referred to merely as "PY74 (A)") include acetoacetic acid allylide-based monoazo pigments. The chemical name of the C.I. Pigment Yellow 74 (A) is 2-[(2-methoxy-4-nitrophenyl)azo]-N-(2-methoxyphenyl)-3-oxobutanamide which is a compound represented by the following formula (2).

The PY74 (A) is commercially available from various makers such as DIC Corp., Dainichiseika Color & Chemicals Mfg. Co., Ltd., and Sanyo Color Works, Ltd.

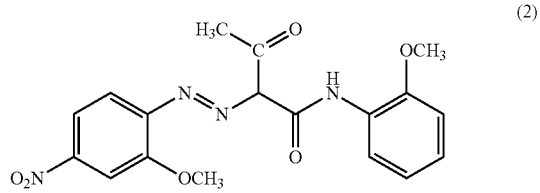 [SMILES: COc1cc([N+](=O)[O-])ccc1/N=N/C(C(C)=O)C(=O)Nc1ccccc1OC]

<Azo Compound (B)>

In the present invention, in order to disperse the PY74 (A) in a finely atomized state and improve a storage stability of the resulting dispersion, the azo compound (B) represented by the following formula (1) (hereinafter occasionally referred to merely as an "azo compound (B)") is used in the dispersion.

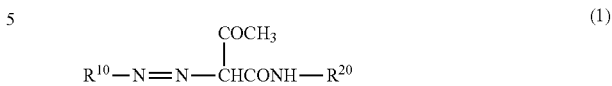

wherein $R^{10}$ and $R^{20}$ are each independently an aryl group which may have a substituent group selected from the group consisting of a methoxy group and a nitro group with the proviso that at least one of $R^{10}$ and $R^{20}$ has a sulfonic acid group and a sulfonic acid amide group.

As the azo compound (B), from the viewpoint of improving a dispersibility of the PY74 (A), there may be mentioned a compound (i) of the formula (1) in which $R^{10}$ is a phenyl group having a sulfonic acid group and a sulfonamide group, and $R^{20}$ is a phenyl group or a phenyl group having at least one substituent group selected from the group consisting of a methoxy group and a nitro group, or a compound (ii) of the formula (1) in which $R^{10}$ is a phenyl group or a phenyl group having at least one substituent group selected from the group consisting of a methoxy group and a nitro group, and $R^{20}$ is a phenyl group having a sulfonic acid group and a sulfonamide group.

In the case of the compound (i), $R^{20}$ is preferably a phenyl group having a methoxy group at an ortho-position thereof.

In the case of the compound (ii), the azo compound is preferably a compound represented by the following formula (3).

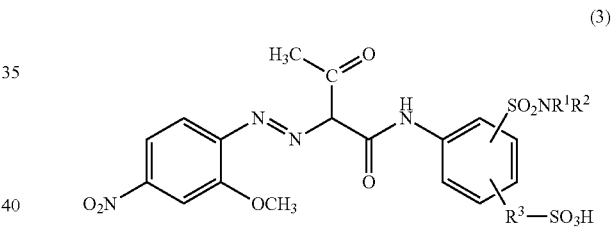

wherein $R^1$ and $R^2$ are each independently a hydrogen atom or an alkyl group or aminoalkyl group having 1 to 12 carbon atoms which may have a substituent group; and $R^3$ is a single bond, a methylene group or an ethylene group.

The azo compound (B) represented by the above formula (3) has a structure containing a sulfonamide group ($—SO_2NR^1R^2$) and a sulfonic acid group ($—R^3—SO_3H$) as substituent groups bonded thereto.

In the formula (3), $R^1$ and $R^2$ are each independently a hydrogen atom or an alkyl group or aminoalkyl group having 1 to 12 carbon atoms which may have a substituent group from the viewpoints of good optical density, storage stability and versatility. Examples of the substituent group include a sulfonic acid group, a carboxyl group and a hydroxyl group.

Examples of the alkyl group as $R^1$ and $R^2$ include alkyl groups having 1 to 3 carbon atoms such as a methyl group, an ethyl group, a propyl group and an isopropyl group.

Examples of the aminoalkyl group as $R^1$ and $R^2$ include those groups represented by the formula: $—(CH_2)_kNR^4R^5$ wherein k is an integer of 1 to 4; and $R^4$ and $R^5$ are each independently a hydrogen atom or an alkyl group having 1 to 6 carbon atoms. Examples of the alkyl group as $R^4$ and $R^5$ include alkyl groups having 1 to 3 carbon atoms such as a methyl group, an ethyl group, a propyl group and an isopropyl group.

Thus, among the above sulfonamide groups (—SO$_2$NR$^1$R$^2$), preferred are those groups in which the amine residue represented by "—NR$^1$R$^2$" is the above "—NH(CH$_2$)$_k$NR$^4$R$^5$" from the viewpoints of good optical density, storage stability, a reduced viscosity when formed into inks, and suppression of change in absorption characteristics thereof.

Specific examples of the above amine residue include an N-aminoethyl group (derived from ethylenediamine), an N-aminopropyl group (derived from 1,3-propylenediamine), an N-methyl-aminoethyl group (derived from N-methyl ethylenediamine), an N-methyl aminopropyl group (derived from N-methyl propanediamine), an N,N-dimethyl aminoethyl group (derived from N,N-dimethyl ethylenediamine), a 3-aminopropyl group, an N-(2-aminoethyl)-3-aminopropyl group, an N-(2-dimethyl aminoethyl)-3-aminopropyl group, an N-alkyl (C$_1$ to C$_{12}$)-3-aminopropyl group, an N,N-dimethyl aminopropyl group (derived from N,N-dimethyl-1,3-propanediamine), and an N,N-bis(2-hydroxyethyl)-3-aminopropyl group.

Among these amine residues, from the viewpoints of a reduced viscosity when formed into inks and suppression of change in absorption characteristics thereof, preferred are an N-alkyl (C$_1$ to C$_3$)-3-aminopropyl group and an N,N-dialkyl (C$_1$ to C$_3$)-3-aminopropyl group.

Examples of the preferred sulfonic acid group (—R$^3$—SO$_3$H) include a sulfonic group (—SO$_3$H), a methylenesulfonic group (—CH$_2$—SO$_3$H) and an ethylenesulfonic group (—CH$_2$CH$_2$—SO$_3$H). Among these groups, more preferred is a sulfonic group (—SO$_3$H). When R$^3$ is a single bond, it is meant that the sulfonic group (—SO$_3$H) is directly bonded to a benzene ring.

In the present invention, the pigment mixture of the PY74 (A) and the azo compound (B) is used. The content of sulfur in the pigment mixture is preferably from 0.25 to 0.7% by weight, more preferably from 0.25 to 0.5% by weight and still more preferably from 0.3 to 0.5% by weight from the viewpoints of high optical density, storage stability and suppression of change in absorption characteristics. The content of the azo compound (B) in the pigment mixture is preferably from 0.5 to 7 mol % and more preferably from 1 to 5 mol % from the viewpoints of high optical density, storage stability and suppression of change in absorption characteristics.

The average primary particle size of the pigment mixture is preferably from 10 to 50 nm, more preferably from 15 to 40 nm and still more preferably from 20 to 35 nm from the viewpoints of a high optical density and a reduced viscosity when formed into inks. The content of sulfur in the pigment mixture and the average primary particle size thereof may be measured by the methods described in Examples below.

<Polymer>

The water dispersion and the water-based ink according to the present invention preferably contain, as the polymer, a water-insoluble polymer (x) solely, or both a water-insoluble polymer (x) and a water-soluble polymer (y).

The "water-insoluble polymer (x)" and the "water-soluble polymer (y)" as used herein respectively mean the following polymers. That is, in the case where the polymer has a salt-forming group, 100 g of pure water at 25° C. are added to 10 g of the polymer whose salt-forming groups are neutralized completely (i.e., 100%) with acetic acid or sodium hydroxide according to kind of the salt-forming group to be neutralized, and the resulting mixture is fully stirred. At this time, when the polymer is completely dissolved in the pure water, the polymer is defined as the "water-soluble polymer (y)". Meanwhile, when using the commercially available polymer or when using the polymer having a neutralization degree of less than 100% which is neutralized with a neutralizing agent other than acetic acid or sodium hydroxide upon synthesis thereof, such a polymer is neutralized 100% by adding acetic acid or sodium hydroxide thereto to determine a solubility thereof.

In the above solubility test, if the polymer partially remains undissolved even when neutralized 100%, the pure water might be difficult to penetrate into the polymer. In such a case, the water-insoluble polymer (x) and the water-soluble polymer (y) may be separated from each other by the following procedure (specifically, by the method described in Examples below).

That is, the polymer is previously dissolved in an organic solvent such as methyl ethyl ketone. The resulting solution as a 100% neutralized product is dropped into pure water, and the organic solvent is removed therefrom to prepare a water dispersion having a concentration of 10% by weight. Then, the water dispersion is subjected to centrifugal separation to separate the polymer in the dispersion into the "water-insoluble polymer (x)" as a precipitated polymer and the "water-soluble polymer (y)" as a dissolved polymer. Meanwhile, the weight percentage of each of the "water-insoluble polymer (x)" and the "water-soluble polymer (y)" in the polymer is expressed by counting fractions of 0.5 and over as a unit and cutting away the rest.

<Water-Insoluble Polymer (x)>

In the present invention, the water-insoluble polymer (x) is preferably used from the viewpoints of atomizing the pigment mixture to improve a dispersibility and, therefore, mainly a storage stability thereof, as well as enhancing an optical density of the resulting ink. The water-insoluble polymer (x) is preferably a vinyl polymer obtained by addition-polymerizing a vinyl monomer or a urethane polymer having a urethane bond, and more preferably a vinyl polymer which is produced by copolymerizing a monomer mixture containing (a) a salt-forming group-containing monomer (hereinafter occasionally referred to merely as a "component (a)") and (b) a hydrophobic monomer (hereinafter occasionally referred to merely as a "component (b)") (such a mixture is hereinafter occasionally referred to merely as a "monomer mixture").

[(a) Salt-Forming Group-Containing Monomer]

The salt-forming group-containing monomer (a) is used from the viewpoints of enhancing a dispersibility of the resulting polymer particles.

Examples of the salt-forming group-containing monomer (a) include cationic monomers and anionic monomers. Among these monomers, preferred are anionic monomers.

Examples of the salt-forming group include a carboxyl group, a sulfonic acid group, a phosphoric acid group, an amino group and an ammonium group. Among these salt-forming groups, especially preferred is a carboxyl group.

Typical examples of the cationic monomers include amine-containing monomers and ammonium salt-containing monomers. Among these cationic monomers, preferred are N,N-dimethylaminoethyl (meth)acrylate, N—(N',N'-dimethylaminopropyl)(meth)acrylamide and vinyl pyrrolidone.

Typical examples of the anionic monomers include carboxylic acid monomers, sulfonic acid monomers and phosphoric acid monomers.

Specific examples of the carboxylic acid monomers include acrylic acid, methacrylic acid, crotonic acid, itaconic acid, maleic acid, fumaric acid, citraconic acid and 2-methacryloyloxymethylsuccinic acid.

Specific examples of the sulfonic acid monomers include styrenesulfonic acid, 2-acrylamido-2-methylpropanesulfonic acid, 3-sulfopropyl (meth)acrylate and bis(3-sulfopropyl)itaconate.

Specific examples of the phosphoric acid monomers include vinylphosphonic acid, vinyl phosphate, bis(methacryloxyethyl)phosphate, diphenyl-2-acryloyloxyethyl phosphate, diphenyl-2-methacryloyloxyethyl phosphate and dibutyl-2-acryloyloxyethyl phosphate.

Among the above anionic monomers, from the viewpoints of a good dispersibility of the polymer particles, preferred are the carboxylic acid monomers, and more preferred are acrylic acid and methacrylic acid.

[(b) Hydrophobic Monomer]

The hydrophobic monomer (b) is used from the viewpoint of enhancing an affinity of the polymer to the pigment mixture. Examples of the hydrophobic monomer include alkyl (meth)acrylates and aromatic group-containing monomers. Among these hydrophobic monomers, from the viewpoints of enhancing an affinity to the pigment mixture as well as a dispersibility and a stability of the polymer particles, preferred are aromatic group-containing monomers.

The preferred alkyl (meth)acrylates are those containing an alkyl group having 1 to 22 carbon atoms and preferably 6 to 18 carbon atoms. Examples of the alkyl (meth)acrylates include methyl (meth)acrylate, ethyl (meth)acrylate, (iso) propyl (meth)acrylate, (iso- or tertiary-)butyl (meth)acrylate, (iso)amyl (meth)acrylate, cyclohexyl (meth)acrylate, 2-ethylhexyl (meth)acrylate, (iso)octyl (meth)acrylate, (iso)decyl (meth)acrylate, (iso)dodecyl (meth)acrylate and (iso)stearyl (meth)acrylate.

Meanwhile, the terms "(iso- or tertiary-)" and "(iso)" as used herein mean both the structure in which the groups expressed by "iso or tertiary" and "iso" respectively are present, and the structure in which these groups are not present (i.e., normal), and the "(meth)acrylate" means acrylate and/or methacrylate.

Examples of the aromatic group-containing monomer include styrene-based monomers and aromatic group-containing (meth)acrylates. Specific examples of the preferred styrene-based monomers include styrene and 2-methyl styrene. Specific examples of the preferred aromatic group-containing (meth)acrylates include benzyl (meth)acrylate and phenoxyethyl (meth)acrylate.

Among these components (b), from the viewpoint of enhancing an affinity of the polymer to the pigment mixture, preferred are styrene and benzyl (meth)acrylate, and more preferred is styrene.

In addition, from the viewpoint of enhancing an affinity to the water-insoluble polymer (x), the component (b) used for the water-insoluble polymer (x) is preferably the same as that used for the below-mentioned water-soluble polymer (y).

The water-insoluble polymer (x) may further optionally contain a constitutional unit derived from (c) a macromer (hereinafter occasionally referred to merely as a "component (c)"), and preferably contains all of the constitutional unit derived from the component (a), the constitutional unit derived from the component (b) and the constitutional unit derived from the component (c).

[(c) Macromer]

The macromer (c) is in the form of a compound which contains a polymerizable functional group at one terminal end thereof and has a number-average molecular weight of from 500 to 100,000, and can be used from the viewpoint of enhancing an affinity of the polymer to the pigment mixture.

The polymerizable functional group bonded to one terminal end of the macromer is preferably an acryloyloxy group or a methacryloyloxy group, and more preferably a methacryloyloxy group. The macromer (c) has a number-average molecular weight of from 500 to 100,000 and preferably from 1,000 to 10,000. Meanwhile, the number-average molecular weight of the macromer (c) may be measured by gel chromatography using chloroform containing 1 mmol/L of dodecyl dimethylamine as a solvent and using polystyrene as a reference standard substance.

As the macromer (c), from the viewpoint of enhancing an affinity of the polymer to the PY74 (A), there are preferably used a styrene-based macromer, an aromatic group-containing (meth)acrylate-based macromer and a silicone-based macromer.

Examples of the styrene-based macromer include homopolymers of styrene-based monomers, and copolymers of the styrene-based monomers with other monomers. When the styrene-based macromer is in the form of the above copolymer, from the viewpoint of enhancing an affinity of the polymer to the pigment mixture, the content of the styrene-based monomer therein is preferably 50% by weight or more, and more preferably 70% by weight or more. Examples of the other monomers to be copolymerized with the styrene-based monomers include aromatic group-containing (meth)acrylates and acrylonitrile. Examples of the styrene-based monomers include styrene and 2-methyl styrene.

Specific examples of the styrene-based macromer include "AS-6(S)", "AN-6(S)" and "HS-6(S)" (tradenames all available from Toagosei Co., Ltd.), etc.

As the aromatic group-containing (meth)acrylate-based macromers, there may be used homopolymers of an aromatic group-containing (meth)acrylate or copolymers of the aromatic group-containing (meth)acrylate with other monomers. When the aromatic group-containing (meth)acrylate-based macromer is in the form of the above copolymer, from the viewpoint of enhancing an affinity of the polymer to the pigment mixture, the content of the aromatic group-containing (meth)acrylate therein is preferably 50% by weight or more, and more preferably 70% by weight or more. Examples of the aromatic group-containing (meth)acrylate include (meth)acrylates containing an arylalkyl group or aryl group having 7 to 12 carbon atoms which may have a substituent group containing a hetero atom. Examples of the aromatic group-containing (meth)acrylate include benzyl (meth)acrylate and phenoxyethyl (meth)acrylate. Among these aromatic group-containing (meth)acrylates, preferred is benzyl (meth) acrylate. Examples of the other monomers to be copolymerized with the aromatic group-containing (meth)acrylate include styrene-based monomers and acrylonitrile.

The macromer (c) may be a silicone-based macromer. Examples of the silicone-based macromer include organopolysiloxanes containing a polymerizable functional group bonded to one terminal end thereof.

The macromer (c) used for the water-insoluble polymer (x) is preferably a polymer of the same monomer as the hydrophobic monomer (b) used for the water-soluble polymer (y) and more preferably the styrene-based macromer from the viewpoint of enhancing an affinity of the water-insoluble polymer (x) to the below-mentioned water-soluble polymer (y).

[(d) Nonionic Monomer]

The monomer mixture may further contain a nonionic monomer (d) (hereinafter occasionally referred to merely as a "component (d)").

Examples of the component (d) include 2-hydroxyethyl (meth)acrylate, 3-hydroxypropyl (meth)acrylate, polyethylene glycol (n=2 to 30 wherein n represents an average molar number of addition of oxyalkylene groups: hereinafter defined in the same way) (meth)acrylate, polypropylene glycol (n=2 to 30) (meth)acrylate, poly(ethylene glycol (n=1 to 15)/propylene glycol (n=1 to 15)) (meth)acrylate, methoxy-polyethylene glycol (n=1 to 30) (meth)acrylate, methoxy-polytetramethylene glycol (n=1 to 30) (meth)acrylate, ethoxy-polyethylene glycol (n=1 to 30) (meth)acrylate, octoxy-polyethylene glycol (n=1 to 30) (meth)acrylate, poly-ethylene glycol (n=1 to 30) (meth)acrylate 2-ethylhexy ether, (iso)propoxy-polyethylene glycol (n=1 to 30) (meth)acrylate, butoxy-polyethylene glycol (n=1 to 30) (meth)acrylate, methoxy-polypropylene glycol (n=1 to 30) (meth)acrylate, methoxy(ethylene glycol/propylene glycol copolymer) (n=1 to 30 in which n of ethylene glycol: 1 to 29) (meth)acrylate, and phenoxy-polyethylene glycol (n=1 to 15)-polypropylene glycol (n=1 to 15)-methacrylate.

Specific examples of commercially available products of the component (d) include "NK ESTER M-40G", "NK ESTER M-90G" and "NK ESTER M-230G" all available from Shin-Nakamura Chemical Co., Ltd.; and "BLEMMER PE-90", "BLEMMER PE-200", "BLEMMER PE-350", "BLEMMER PME-100", "BLEMMER PME-200", "BLEMMER PME-400", "BLEMMER PME-1000", "BLEMMER PP-500", "BLEMMER PP-800", "BLEMMER PP-1000", "BLEMMER AP-150", "BLEMMER AP-400", "BLEMMER AP-550", "BLEMMER AP-800", "BLEMMER 50PEP-300", "BLEMMER 50POEP-800B" and "BLEMMER 43PAPE-600B" all available from NOF Corporation.

These components (a) to (d) are respectively used alone or in the form of a mixture of any two or more thereof.

The contents of the respective constitutional units derived from the above components (a) to (d) in the water-insoluble polymer (x) are as follows.

The content of the constitutional unit derived from the component (a) is preferably from 4 to 40% by weight, more preferably from 5 to 30% by weight, still more preferably from 10 to 30% by weight and especially preferably from 10 to 25% by weight from the viewpoint of enhancing a dispersibility of the polymer particles.

The content of the constitutional unit derived from the component (b) is preferably from 5 to 98% by weight and more preferably from 10 to 60% by weight from the viewpoint of enhancing an affinity of the polymer to the pigment mixture.

The content of the constitutional unit derived from the component (c) is preferably from 1 to 25% by weight and more preferably from 5 to 20% by weight from the viewpoint of enhancing an affinity of the polymer to the pigment mixture.

The content of the constitutional unit derived from the component (d) is preferably from 5 to 60% by weight and more preferably from 17 to 50% by weight from the viewpoint of enhancing a dispersibility of the polymer particles.

Also, the water-insoluble polymer (x) in which an anionic monomer is used as the component (a) preferably has an acid value of from 50 to 200 and more preferably from 50 to 160.

The water-insoluble polymer (x) preferably has a weight-average molecular weight of from 5,000 to 500,000, more preferably from 10,000 to 400,000, still more preferably from 10,000 to 300,000 and especially preferably from 20,000 to 300,000 from the viewpoint of a good storage stability of the resulting water dispersion and water-based ink. Meanwhile, the weight-average molecular weight of the polymer may be measured by the method described in Examples below.

<Water-Soluble Polymer (y)>

In the present invention, the water-insoluble polymer (x) is preferably used in combination with the water-soluble polymer (y) from the viewpoints of atomizing the pigment mixture to improve a dispersibility and therefore mainly reduce a viscosity of the resulting ink, as well as suppressing a change in absorption characteristics of the pigment mixture. The water-soluble polymer (y) is preferably a vinyl polymer obtained by addition-polymerizing a vinyl monomer or a urethane-based polymer having a urethane bond, and more preferably a vinyl polymer which is produced by copolymer-izing a monomer mixture (the same as the "monomer mixture" described above) containing (a) a salt-forming group-containing monomer (the same as the "component (a)" described above) and (b) a hydrophobic monomer (the same as the "component (b)" described above).

[(a) Salt-Forming Group-Containing Monomer]

Specific examples and preferred examples of the salt-forming group-containing monomer (a) used for the water-soluble polymer (y) are the same as those described above. Among these monomers, from the viewpoint of a good dispersibility of the polymer particles, preferred are carboxylic acid monomers, more preferred are acrylic acid and methacrylic acid, and still more preferred is acrylic acid from the viewpoint of a good solubility in water.

[(b) Hydrophobic Monomer]

Specific examples and preferred examples of the hydrophobic monomer (b) used for the water-soluble polymer (y) are the same as those described above. Among these components (b), from the viewpoint of enhancing an affinity of the polymer to the pigment mixture, preferred are styrene and benzyl (meth)acrylate, and more preferred is styrene.

In addition, as described above, from the viewpoint of enhancing an affinity to the water-insoluble polymer (x), the component (b) used for the water-soluble polymer (y) is preferably the same as that used for the water-insoluble polymer (x).

The water-soluble polymer (y) preferably contains a constitutional unit derived from the component (a) in an amount of from 5 to 80% by weight, more preferably from 10 to 60% by weight and still more preferably from 15 to 40% by weight, and a constitutional unit derived from the component (b) in an amount of from 15 to 95% by weight, more preferably from 25 to 90% by weight and still more preferably from 50 to 80% by weight. The constitutional unit derived from the component (b) is preferably a constitutional unit derived from the styrene monomer. The content of the constitutional unit derived from the styrene monomer in the water-soluble polymer (y) is preferably from 50 to 90% by weight and more preferably from 50 to 80% by weight on the basis of a total weight of all monomers contained in the water-soluble polymer (y).

The water-soluble polymer (y) preferably has a weight-average molecular weight of from 1,000 to 300,000 and more preferably from 10,000 to 200,000 from the viewpoint of a good dispersibility. Meanwhile, the weight-average molecular weight of the water-soluble polymer (y) may be measured by the method described in Examples below.

The water-soluble polymer (y) in which an anionic monomer is used as the component (a) preferably has an acid value of from 150 to 300 mgKOH/g and more preferably from 170 to 250 mgKOH/g.

Examples of commercially available products of the water-soluble polymer (y) include "JONCRYL (registered trademark) 57J", "JONCRYL 60J", "JONCRYL 61J", "JONCRYL 63J", "JONCRYL 70J", "JONCRYL PD-96J" and "JONCRYL 501J" all available from BASF Japan, Ltd.

[Production of Polymer]

The water-insoluble polymer (x) and the water-soluble polymer (y) used in the present invention (both the polymers are hereinafter occasionally generally referred to merely as the "polymer") may be respectively produced by copolymerizing the monomer mixture by known polymerization methods such as bulk polymerization, solution polymerization, suspension polymerization and emulsion polymerization. Among these polymerization methods, preferred is the solution polymerization.

The solvent used in the solution polymerization method is preferably an polar organic solvent. The polar organic solvent miscible with water may be used in the form of a mixture with water. Examples of the polar organic solvents include aliphatic alcohols having 1 to 3 carbon atoms; ketones having 3 to 8 carbon atoms; esters such as ethyl acetate; and mixed solvents of at least one of these compounds with water.

The polymerization may be carried out in the presence of a conventionally known radical polymerization initiator such as azo compounds and organic peroxides. The amount of the radical polymerization initiator to be used in the polymerization is preferably from 0.001 to 5 mol and more preferably from 0.01 to 2 mol per 1 mol of the monomer mixture.

The polymerization may also be carried out in the presence of a conventionally known chain transfer agent, e.g., mercaptans such as octyl mercaptan and 2-mercapto ethanol, and thiuram disulfides.

The polymerization conditions of the monomer mixture may vary depending upon the kinds of radical polymerization initiator, monomers, solvent, etc., to be used in the polymerization reaction, and therefore are not particularly limited. The polymerization is generally conducted at a temperature of preferably from 30 to 100° C. and more preferably from 50 to 80° C. The polymerization time is preferably from 1 to 20 h. Further, the polymerization is preferably conducted in a nitrogen atmosphere or in an atmosphere of an inert gas such as argon.

After completion of the polymerization reaction, the polymer thus produced may be isolated from the reaction solution by a known method. The thus obtained polymer may also be purified by reprecipitation, membrane separation, chromatography, extraction, etc., for removing unreacted monomers, etc., therefrom.

In the present invention, the polymers are preferably used after the salt-forming group thereof derived from the salt-forming group-containing monomer (a) is neutralized with a neutralizing agent. When the salt-forming group is an anionic group, as the neutralizing agent, there may be used, for example, bases such as sodium hydroxide, potassium hydroxide and various amines.

The degree of neutralization of the salt-forming group contained in the polymer is preferably from 10 to 300%, more preferably from 20 to 200% and still more preferably from 30 to 150% from the viewpoint of a good dispersion stability of the polymer particles (A) in the resulting ink.

The degree of neutralization of the anionic salt-forming group is calculated according to the following formula:

$$\{[\text{weight (g) of neutralizing agent/equivalent of neutralizing agent}]/[\text{acid value of polymer (mgKOH/g)} \times \text{weight (g) of polymer}/(56 \times 1000)]\} \times 100$$

The acid value may be calculated from the respective constitutional units of the polymer, or may also be determined by the method of subjecting a solution prepared by dissolving the polymer in an appropriate solvent (such as, for example, methyl ethyl ketone) to titration.

[Pigment Mixture-Containing Polymer Particles]

In the water dispersion and the water-based ink according to the present invention, the above pigment mixture is dispersed in water with the polymer. The pigment mixture is preferably used in the form of "pigment mixture-containing polymer particles" or "pigment mixture-containing crosslinked polymer particles" in which the pigment mixture is incorporated in the polymer.

The pigment mixture-containing polymer particles (hereinafter occasionally referred to merely as "polymer particles (A)") are obtained by subjecting the pigment mixture to dispersing treatment with the water-insoluble polymer (x) solely or with the water-insoluble polymer (x) and the water-soluble polymer (y).

By using the water-insoluble polymer (x) solely as a dispersant for the pigment mixture or by using the water-insoluble polymer (x) in combination with the water-soluble polymer (y) as the dispersant, it is possible to obtain a water dispersion and a water-based ink for ink-jet printing which exhibit a high optical density and is excellent in storage stability even when they have a high solid content. In addition, when using the water-insoluble polymer (x) in combination with the water-soluble polymer (y), it is further possible to reduce a viscosity of the resulting ink, suppress the change in absorption characteristics of the pigment, and enhance a storage stability of the resulting water dispersion or ink. The reason therefor is considered to be that the surface of respective particles of the pigment mixture is coated with the water-insoluble polymer (x) to thereby finely disperse the pigment mixture in water, and further the water-soluble polymer (y) stabilizes the pigment-containing water-insoluble polymer particles.

The weight ratio of the pigment mixture to the water-insoluble polymer (x) [pigment mixture/water-insoluble polymer (x)] is preferably from 1 to 20, more preferably from 1 to 10 and still more preferably from 2 to 6 from the viewpoints of a high optical density and a good storage stability of the resulting water dispersion or water-based ink.

The weight ratio of the pigment mixture to the water-soluble polymer (y) [pigment mixture/water-soluble polymer (y)] is preferably from 15 to 25, more preferably from 17 to 25 and still more preferably from 17 to 23 from the viewpoints of reducing a viscosity of the resulting ink and suppressing the change in absorption characteristics of the pigment.

The weight ratio of the pigment mixture to a sum of the water-insoluble polymer (x) and the water-soluble polymer (y) [(x)+(y)] used for dispersing the pigment mixture [pigment mixture/[(x)+(y)]] is preferably from 50/50 to 95/5, more preferably from 60/40 to 95/5 and still more preferably from 70/30 to 95/5 from the viewpoints of enhancing an optical density and a storage stability of the resulting dispersion or ink, as well as reducing a viscosity of the resulting ink and suppressing the change in absorption characteristics of the pigment.

The weight ratio of the water-insoluble polymer (x) to the water-soluble polymer (y) [(x)/(y)] is from 2.0 to 5.0, preferably from 2.5 to 4.5 and more preferably from 3.0 to 4.0 from the viewpoints of enhancing an optical density and a storage stability of the resulting dispersion or ink, as well as reducing a viscosity of the resulting ink and suppressing the change in absorption characteristics of the pigment.

The polymer particles (A) are preferably produced in the form of a water dispersion thereof by the below-mentioned processes 1 or 2 for production of the water dispersion which includes the steps (1) and (2) or the steps (I) and (II) from the viewpoint of a high production efficiency.

[Pigment Mixture-Containing Crosslinked Polymer Particles]

The water dispersion or water-based ink according to the present invention preferably contain a crosslinked polymer obtained by subjecting the water-insoluble polymer (x) solely or the water-insoluble polymer (x) and the water-soluble polymer (y) to crosslinking treatment from the viewpoint of enhancing an optical density of the resulting ink while maintaining a low viscosity thereof.

The crosslinking rate (mol %) of the crosslinked polymer is preferably from 10 to 90 mol %, more preferably from 20 to 80 mol % and still more preferably from 30 to 70 mol %. The crosslinking rate may be determined by the below-mentioned method.

The crosslinked polymer particles are preferably produced in the form of a water dispersion thereof by the below-mentioned processes for production of the water-based ink which further include the step (3) or the step (III) from the viewpoint of a high production efficiency.

[Process 1 for Production of Water Dispersion for Ink-Jet Printing]

In the present invention, when using the water-insoluble polymer (x) as the polymer, the water dispersion for ink-jet printing can be efficiently produced according to the process including the following steps (1) and (2). Further, according to the process further including the following step (3), it is possible to efficiently produce the water dispersion for ink-jet printing which contains crosslinked polymer particles containing a crosslinked polymer obtained by subjecting the water-insoluble polymer (x) to crosslinking treatment.

Step (1): dispersing a mixture containing the water-insoluble polymer (x), an organic solvent, the pigment mixture and water, if required, together with a neutralizing agent, to obtain a dispersion of the pigment mixture-containing water-insoluble polymer (x) particles.

Step (2): removing the organic solvent from the dispersion obtained in the above step (1) to obtain a water dispersion of the pigment mixture-containing water-insoluble polymer (x) particles.

Step (3): crosslinking the polymer of the pigment mixture-containing water-insoluble polymer (x) particles obtained in the above step (2) with a crosslinking agent to obtain a water dispersion of the pigment mixture-containing crosslinked polymer particles.

The water-based ink for ink-jet printing according to the present invention can be produced by adding additives ordinarily used for water-based inks such as a wetting agent to the dispersion obtained through the above steps (1) and (2) or through the above steps (1) to (3), if required.

Step (1)

In the step (1), there is preferably used the method in which the water-insoluble polymer (x) is first dissolved in the organic solvent, and then the pigment mixture and water are added, if required, together with optional components such as a neutralizing agent and a surfactant, to the thus obtained organic solvent solution and mixed therewith to obtain a dispersion of an oil-in-water type. The order of addition of the respective components to the organic solvent solution of the water-insoluble polymer (x) is not particularly limited, and it is preferred that the neutralizing agent, water and the pigment mixture be successively added to the organic solvent solution in this order.

The content of the pigment mixture in the above mixture is preferably from 5 to 50% by weight and more preferably from 10 to 40% by weight; the content of an organic solvent in the mixture is preferably from 10 to 70% by weight and more preferably from 10 to 50% by weight; the content of the water-insoluble polymer (x) in the mixture is preferably from 2 to 40% by weight and more preferably from 3 to 20% by weight; and the content of water in the mixture is preferably from 10 to 70% by weight and more preferably from 20 to 70% by weight.

The weight ratio of the pigment mixture to the water-insoluble polymer (x) [pigment mixture/water-insoluble polymer (x)] is preferably the same as described above.

When the polymer contains a salt-forming group, a neutralizing agent is preferably used. When neutralizing the salt-forming group with the neutralizing agent, the degree of neutralization is not particularly limited. However, the neutralization treatment is preferably carried out such that the finally obtained water dispersion usually exhibits a neutral liquid property, for example, a pH of 4.5 to 10. The pH of the water dispersion may be determined from the desired neutralization degree of the polymer. Examples of the neutralizing agent include those described above. Also, the polymer may be previously neutralized.

Examples of the organic solvent include alcohol solvents such as ethanol, isopropanol and isobutanol; ketone solvents such as acetone, methyl ethyl ketone, methyl isobutyl ketone and diethyl ketone; and ether solvents such as dibutyl ether, tetrahydrofuran and dioxane. The solubility of the organic solvent in 100 g of water as measured at 20° C. is preferably 5 g or more, and more preferably 10 g or more, more specifically, preferably from 5 to 80 g and more preferably from 10 to 50 g. Among these organic solvents, preferred are methyl ethyl ketone and methyl isobutyl ketone.

The method for dispersing the mixture in the step (1) is not particularly limited. The pigment mixture-containing water-insoluble polymer (x) particles may be atomized into fine particles having a desired average particle size only by a substantial dispersion procedure. Preferably, the mixture is first subjected to a preliminary dispersion procedure, and then to the substantial dispersion procedure by applying a shear stress thereto so as to control the average particle size of the pigment mixture-containing water-insoluble polymer (x) particles to a desired value. The dispersion procedure in the step (1) is preferably conducted at a temperature of from 0 to 40° C. and more preferably from 5 to 30° C. The dispersing time is preferably from 1 to 30 h and more preferably from 2 to 25 h.

When subjecting the mixture to the preliminary dispersion procedure, there may be used ordinary mixing or stirring devices such as anchor blades and disper blades. Specific examples of the preferred mixing or stirring devices include high-speed stirring mixers such as "Ultra Disper" and "Dispamill" (tradenames: both available from Asada Iron Works Co., Ltd.), "Milder" (tradename: available from Ebara Corp. and Pacific Machinery & Engineering Co., Ltd.), and "TK Homo Mixer", "TK Pipeline Mixer", "TK Homo Jetter", "TK Homomic Line Flow" and "Filmix" (tradenames: all available from Primix Corp.).

As a means for applying a shear stress to the mixture in the substantial dispersion procedure, there may be used, for example, kneading machines such as roll mills, kneaders and extruders, homo-valve-type high-pressure homogenizers such as typically "High-Pressure Homogenizer" (tradename: available from Izumi Food Machinery Co., Ltd.), chamber-type high-pressure homogenizers such as "Microfluidizer" (tradename: available from Microfluidics Inc.), "Nanomizer" (tradename: available from Yoshida Kikai Co., Ltd.) and "Ultimizer" and ""Starburst" (tradenames: both available from Sugino Machine Ltd.), and media type dispersers such as a paint shaker and a beads mill. Examples of commercially available products of the media type dispersers include "Ultra Apex Mill" (tradename: available from Kotobuki Industries Co., Ltd.), "Pico Mill" (tradename: available from Asada Iron Works Co., Ltd.), and "Dyno-Mill" (tradename: available from Shinmaru Enterprises Corp.). These apparatuses may be used in combination of any two or more thereof. Among these apparatuses, the high-pressure homogenizers are preferably used from the viewpoint of reducing a particle size of the pigment mixture.

Step (2)

In the step (2), the organic solvent is removed by distillation from the dispersion obtained in the previous step by any known methods to obtain a water dispersion of the pigment mixture-containing water-insoluble polymer (x) particles. The organic solvent is preferably substantially completely removed from the thus obtained water dispersion of the pigment mixture-containing water-insoluble polymer (x) particles. However, the residual organic solvent may be present in the water dispersion unless the objects and effects of the present invention are adversely affected by the residual organic solvent. When subsequently subjecting the water dispersion to the crosslinking step, the residual organic solvent may also be removed from the water dispersion obtained after subjected to crosslinking reaction, if required. The content of the residual organic solvent in the finally obtained water dispersion of the pigment mixture-containing water-insoluble polymer (x) particles is preferably 0.1% by weight or less and more preferably 0.01% by weight or less.

In addition, if required, the dispersion may be subjected to heating and stirring treatments before removing the organic solvent by distillation therefrom.

In the thus-obtained water dispersion of the pigment mixture-containing water-insoluble polymer (x) particles, solid components of the pigment mixture-containing polymer are dispersed in an aqueous medium containing water as a main medium. The configuration of the polymer particles is not particularly limited, and the polymer particles may have any configuration as long as the particles are formed from at least the pigment mixture and the water-insoluble polymer (x). Examples of the configuration of the polymer particles (A) include the particle configuration in which the pigment mixture is enclosed in the water-insoluble polymer (x), the particle configuration in which the pigment mixture is uniformly dispersed in the water-insoluble polymer (x), and the particle configuration in which the pigment mixture is exposed onto a surface of the respective water-insoluble polymer (x) particles as well as mixtures thereof.

Step (3)

In the step (3), the polymer contained in the pigment mixture-containing water-insoluble polymer (x) particles obtained in the step (2) is crosslinked with a crosslinking agent to obtain a water dispersion of the pigment mixture-containing crosslinked polymer particles. The step (3) is preferably additionally carried out from the viewpoints of reducing a viscosity of the resulting water-based ink and enhancing an optical density thereof.

The crosslinking agent used in the above step is preferably in the form of a compound containing a functional group capable of reacting with the salt-forming group of the polymer, more preferably a compound containing the two or more functional groups in a molecule thereof, and still more preferably a compound containing the 2 to 6 functional groups in a molecule thereof.

In order to allow a surface of the polymer to efficiently undergo the crosslinking reaction, the solubility of the crosslinking agent in 100 g of water as measured at 25° C. is preferably 50 g or less, more preferably 40 g or less and still more preferably 30 g or less. The molecular weight of the crosslinking agent is preferably from 120 to 2000, more preferably from 150 to 1500 and still more preferably from 150 to 1000 from the viewpoints of a reduced viscosity and a high optical density of the resulting ink.

(Crosslinking Agent)

Examples of the suitable crosslinking agent include the following compounds (a) to (c):

(a) Compounds Containing Two or More Epoxy Groups in a Molecule Thereof:

Examples of the compounds containing two or more epoxy groups in a molecule thereof include polyglycidyl ethers such as ethylene glycol diglycidyl ether, polyethylene glycol diglycidyl ether, polypropylene glycol diglycidyl ether, glycerol triglycidyl ether, glycerol polyglycidyl ether, polyglycerol polyglycidyl ether, trimethylolpropane polyglycidyl ether, sorbitol polyglycidyl ether, pentaerythritol polyglycidyl ether, resorcinol diglycidyl ether, neopentyl glycol diglycidyl ether and hydrogenated bisphenol A-type diglycidyl ether.

(b) Compounds Containing Two or More Oxazoline Groups in a Molecule Thereof:

Examples of the compounds containing two or more oxazoline groups in a molecule thereof include bisoxazoline compounds such as 2,2'-bis(2-oxazoline), 1,3-phenylene-bisoxazoline and 1,3-benzobisoxazoline, and compounds containing an end oxazoline group which are obtained by reacting the bisoxazoline compound with a polybasic carboxylic acid.

(c) Compounds Containing Two or More Isocyanate Groups in a Molecule Thereof:

Examples of the compounds containing two or more isocyanate groups in a molecule thereof include organic polyisocyanates and isocyanate group-terminated prepolymers.

Among these crosslinking agents, preferred are the compounds (a) containing two or more epoxy groups in a molecule thereof, and more preferred are ethylene glycol diglycidyl ether and trimethylolpropane polyglycidyl ether.

The amount of the crosslinking agent used in the crosslinking treatment is adjusted such that the weight ratio of the crosslinking agent to the polymer [crosslinking agent/polymer] is preferably from 0.1/100 to 50/100, more preferably from 0.5/100 to 40/100, still more preferably from 1/100 to 30/100 and especially preferably from 2/100 to 25/100 from the viewpoint of a reduced viscosity of the resulting ink.

The amount of the crosslinking agent used is also adjusted such that the molar amount of a reactive group in the crosslinking agent which is capable of reacting with 1 g of the polymer is preferably from 0.01 to 10 mmol, more preferably from 0.05 to 5 mmol and still more preferably from 0.1 to 2 mmol.

The crosslinked polymer contained in the water dispersion of the crosslinked polymer particles obtained in the step (3) preferably contains a neutralized salt-forming group (preferably a carboxyl group) in an amount of 0.5 mmol or more per 1 g of the crosslinked polymer. It is considered that such a crosslinked polymer is dissociated in the water dispersion and contributes to stabilization of the pigment mixture-containing crosslinked polymer particles owing to charge repulsion between the salt-forming groups.

The crosslinking rate (mol %) of the crosslinked polymer as determined from the following formula (3) is preferably from 10 to 90 mol %, more preferably from 20 to 80 mol % and still more preferably from 30 to 70 mol %. The crosslinking rate may be calculated from the amount of the crosslinking agent used and the number of moles of the reactive group therein as well as the amount of the polymer used and the number of moles of a reactive group therein which is capable of reacting with the reactive group in the crosslinking agent.

Crosslinking Rate (mol %)=[(number of moles of reactive group in crosslinking agent)/(number of moles of reactive group in polymer which is capable of reacting with the reactive group in crosslinking agent)]×100 (3)

In the above formula (3), the "number of moles of reactive group in crosslinking agent" is the value obtained by multiplying the number of moles of the crosslinking agent used by the number of the reactive groups contained in a molecule of the crosslinking agent.

Meanwhile, the crosslinking of the polymer may be carried out by mixing the dispersion of the pigment mixture-containing polymer particles obtained in the step (1) with the crosslinking agent. In this case, the step for removal of the organic solvent from the water dispersion of crosslinked polymer particles obtained in the above crosslinking step may be conducted in the same manner as in the above step (2) to thereby obtain a water dispersion of the pigment mixture-containing crosslinked polymer particles.

[Process 2 for Production of Water Dispersion for Ink-Jet Printing]

In the present invention, when using the water-soluble polymer (y) and the water-insoluble polymer (x) as the polymer, it is possible to efficiently produce the water dispersion for ink-jet printing according to the process including the following steps (I) and (II). Also, by using the process further including the step (III), it is possible to efficiently produce the water dispersion for ink-jet printing which includes the crosslinked polymer particles containing the crosslinked polymer obtained by subjecting the water-soluble polymer (y) and the water-insoluble polymer (x) to crosslinking treatment.

Step (I): dispersing the pigment mixture in the water-soluble polymer (y) and water to obtain a water dispersion.

Step (II): adding the water-insoluble polymer (x) to the water dispersion obtained in the step (I) to further disperse the water-insoluble polymer (x) therein to thereby obtain a dispersion of the pigment mixture-containing polymer particles (A).

Step (III): subjecting the dispersion obtained in the step (II) or a water dispersion obtained by removing the solvent from the dispersion to crosslinking treatment.

The water-based ink for ink-jet printing according to the present invention can be produced by adding additives ordinarily used for water-based inks such as a wetting agent to the dispersion obtained through the steps (I) and (II) or through the steps (I) to (III), if required.

Step (I)

In the step (I), the pigment mixture is dispersed in water with the water-soluble polymer (y) to prepare a water dispersion. According to the preferred method for the step (I), the water-soluble polymer (y), the pigment mixture and water, if required, together with optional additives such as a neutralizing agent and a surfactant, are first mixed with each other to obtain a mixture, and then the resulting mixture is dispersed using a disperser.

The content of the pigment mixture in the mixture is preferably from 5 to 50% by weight and more preferably from 10 to 40% by weight; the content of an organic solvent in the mixture is preferably from 10 to 70% by weight and more preferably from 10 to 50% by weight; the content of the water-soluble polymer (y) in the mixture is preferably from 2 to 40% by weight and more preferably from 3 to 20% by weight; and the content of water in the mixture is preferably from 10 to 70% by weight and more preferably from 20 to 70% by weight.

The preferred weight ratio between the water-soluble polymer (y) and the pigment mixture is the same as described above.

When neutralized using a neutralizing agent, the neutralization treatment is preferably carried out such that the finally obtained water dispersion has a pH value of from 7 to 11. Examples of the neutralizing agent include sodium hydroxide, potassium hydroxide and various amines. Also, the water-soluble polymer (y) may be previously neutralized. Meanwhile, examples of the organic solvent include the same organic solvents as described above.

The method for dispersing the mixture in the step (I) is not particularly limited. The pigment mixture particles in the mixture may be atomized into fine particles having a desired average particle size only by a substantial dispersion procedure. Preferably, the mixture is first subjected to a preliminary dispersion procedure, and then to the substantial dispersion procedure by applying a shear stress thereto so as to control the average particle size of the pigment mixture particles to a desired value. The dispersion procedure in the step (I) is preferably conducted at a temperature of from 5 to 50° C. and more preferably from 5 to 35° C. The dispersing time is preferably from 1 to 30 h and more preferably from 1 to 25 h.

When subjecting the mixture to the preliminary dispersion procedure, there may be used the same high-speed stirring mixers as used in the above production process 1.

As a means for applying a shear stress to the mixture in the substantial dispersion procedure, there may be used the same apparatuses as used in the above production process 1. Among these apparatuses, the media type dispersers are preferably used from the viewpoints of reducing a particle size of the pigment mixture particles and stabilizing the resulting dispersion.

Step (II)

In the step (II), the water-insoluble polymer (x) is added to the water dispersion obtained in the step (I) for further dispersing the water-insoluble polymer (x) therein to thereby obtain a dispersion containing the pigment mixture-containing polymer particles (A). The step (II) is preferably conducted by the method in which the water dispersion obtained in the step (I) is mixed with the water-insoluble polymer (x), the organic solvent and water and, if required, further with a neutralizing agent, a surfactant, etc., to prepare a mixture thereof, and then the resulting mixture is dispersed. In such a method, there is preferably used a dispersion of the water-insoluble polymer (x) which contains the water-insoluble polymer (x), the organic solvent and water.

The content of the pigment mixture in the above mixture is preferably from 5 to 50% by weight and more preferably from 10 to 40% by weight; the content of the organic solvent in the mixture is preferably from 10 to 70% by weight and more preferably from 10 to 50% by weight; the content of the water-insoluble polymer (x) in the mixture is preferably from 2 to 40% by weight and more preferably from 3 to 20% by weight; and the content of water in the mixture is preferably from 10 to 70% by weight and more preferably from 20 to 70% by weight.

The preferred weight ratio between the water-insoluble polymer (x) and the pigment mixture is the same as described above.

When the polymer is neutralized with a neutralizing agent, the degree of neutralization is preferably controlled such that the finally obtained water dispersion has a pH value of from 7 to 11. In addition, the anionic polymer may be previously neutralized.

Examples of the suitable organic solvent include the same organic solvents as used in the above production process 1.

The method for dispersing the mixture in the step (II) is not particularly limited similarly to the step (I). The polymer particles may be atomized into fine particles having a desired average particle size only by a substantial dispersion procedure. Preferably, the mixture is first subjected to a preliminary dispersion procedure, and then to the substantial dispersion procedure by applying a shear stress thereto. The dispersion procedure in the step (II) is preferably conducted at a temperature of from 5 to 50° C. and more preferably from 5 to 35° C. The dispersing time is preferably from 1 to 30 h and more preferably from 2 to 25 h.

When subjecting the mixture to the preliminary dispersion procedure, there may be used the same mixing or stirring devices as described above, etc.

As a means for applying a shear stress to the mixture in the substantial dispersion procedure, there may be used the same kneading machines, high-pressure homogenizers and media type dispersers as described above. Among these apparatuses, the high-pressure homogenizers are preferably used from the viewpoints of reducing a particle size of the polymer particles (A) and stabilizing the resulting dispersion.

(Solvent Removal Step)

In the above process for producing the water-based ink according to the present invention, subsequent to the step (II), there may be further carried out an optional step in which the organic solvent is removed by distillation from the dispersion containing the polymer particles (A) which is obtained in the step (II), by well known methods to render the dispersion aqueous, thereby obtaining a water dispersion of the polymer particles (A). This step may be carried out after completion of the step (II).

The organic solvent is preferably substantially completely removed from the thus obtained water dispersion of the polymer particles (A). However, the residual organic solvent may be present in the water dispersion unless the objects and effects of the present invention are adversely affected by the residual organic solvent. When subsequently subjecting the water dispersion to the crosslinking step, the residual organic solvent may further be removed from the water dispersion obtained after completion of the crosslinking reaction, if required. The content of the residual organic solvent in the finally obtained water dispersion of the polymer particles (A) is preferably 0.1% by weight or less and more preferably 0.01% by weight or less.

In addition, if required, the dispersion may be subjected to heating and stirring treatments before removing the organic solvent by distillation therefrom.

In the thus-obtained water dispersion of the polymer particles (A), solid components of the polymer are dispersed in an aqueous medium containing water as a main medium. The configuration of the polymer particles (A) is not particularly limited, and the polymer particles (A) may have any configuration as long as the particles are formed from at least the pigment mixture and the polymer. Examples of the configuration of the polymer particles (A) include the particle configuration in which the pigment mixture is enclosed in the polymer, the particle configuration in which the pigment mixture is uniformly dispersed in the polymer, and the particle configuration in which the pigment mixture is exposed onto a surface of the respective polymer particles.

Step (III)

In the step (III), the dispersion of the polymer particles (A) obtained in the step (II) or the water dispersion obtained by removing the solvent from the dispersion is subjected to crosslinking treatment. In the step (III), a crosslinking agent is added to the dispersion of the polymer particles (A) obtained in the step (II) or the water dispersion of the polymer particles (A) obtained by removing the solvent from the dispersion obtained in the step (II) if the solvent is contained therein, to thereby obtain a water dispersion containing crosslinked polymer particles obtained by subjecting the water-insoluble polymer (x) and the water-soluble polymer (y) to crosslinking treatment. The step (III) is preferably additionally carried out from the viewpoints of reducing a viscosity of the resulting water-based ink and enhancing an optical density thereof.

When the polymer is crosslinked by mixing the dispersion of the pigment mixture-containing polymer particles (A) obtained in the step (II) with the crosslinking agent, the dispersion of the crosslinked polymer particles obtained in the crosslinking treatment may be subjected to the same solvent removal step as described above to remove the organic solvent from the dispersion, thereby obtaining the water dispersion as aimed.

Examples of the suitable crosslinking agent include the same crosslinking agents as described above.

The amount of the crosslinking agent used, the amount of the salt-forming group (preferably a carboxyl group) neutralized per 1 g of the crosslinked polymer, and the crosslinking rate of the crosslinked polymer (mol %) are respectively the same as described above.

<Water Dispersion for Ink-Jet Printing>

The water dispersion for ink-jet printing according to the present invention is a water dispersion obtained by dispersing the above pigment mixture with the water-insoluble polymer (x) and preferably a water dispersion of the pigment mixture-containing polymer particles (A), or a water dispersion obtained by crosslinking the polymer with a crosslinking agent and preferably a water dispersion of the pigment mixture-containing crosslinked polymer particles.

In the preferred embodiments, the water-based ink for ink-jet printing according to the present invention is a water dispersion obtained by dispersing the above pigment mixture with the water-insoluble polymer (x) and the water-soluble polymer (y) and preferably a water dispersion of the pigment mixture-containing polymer particles (A), or a water dispersion obtained by crosslinking the polymers with a crosslinking agent and preferably a water dispersion of the pigment mixture-containing crosslinked polymer particles.

The water dispersion according to the present invention is excellent in storage stability even when the content of the pigment mixture therein is increased. The "content of the pigment mixture" as used herein means a total pigment solid content of C.I. Pigment Yellow 74 (A) and the azo compound (B) represented by the above formula (1).

The content of the pigment mixture in the water dispersion according to the present invention is preferably from 15 to 35% by weight, more preferably from 20 to 30% by weight and still more preferably from 21 to 28% by weight from the viewpoint of a good storage stability.

The content of the polymer (water-insoluble polymer (x)+water-soluble polymer (y)) in the water dispersion according to the present invention is preferably from 2 to 15% by weight, more preferably from 3 to 10% by weight and still more preferably from 3 to 8% by weight from the viewpoint of a good storage stability.

The content of water in the water dispersion according to the present invention is preferably from 30 to 80% by weight, more preferably from 40 to 70% by weight and still more preferably from 50 to 65% by weight.

The surface tension of the water dispersion according to the present invention (as measured at 20° C.) is preferably from 30 to 70 mN/m and more preferably from 35 to 65 mN/m.

The viscosity of the water dispersion having a solid content of 30% by weight (as measured at 20° C.) is preferably from 1 to 12 mPa·s, more preferably from 2 to 11 mPa·s, still more preferably from 2 to 8 mPa·s and especially preferably from 2 to 6 mPa·s.

<Water-Based Ink for Ink-Jet Printing>

The water-based ink for ink-jet printing according to the present invention contains the above water dispersion.

The water-based ink for ink-jet printing according to the present invention which includes the water dispersion produced by the above production process, may further contain various additives ordinarily used for water-based inks such as a wetting agent, a penetrant, a dispersant, a surfactant, a viscosity modifier, a defoaming agent, an antiseptic agent, a mildew-proof agent and a rust preventive, if required.

As the wetting agent or the penetrant, there may be suitably used glycerol, triethylene glycol, etc. As the surfactant, there may be suitably used an adduct of 2,4,7,9-tetramethyl-5-decyne-4,7-diol with 10 mol of ethyleneoxide, etc.

The water-based ink according to the present invention exhibits a reduced viscosity and an excellent storage stability even when the content of the pigment therein is increased.

The total pigment solid content of the PY74 (A) and the azo compound (B) in the water-based ink according to the present invention is preferably from 3 to 20% by weight, more preferably from 5 to 15% by weight, still more preferably from 8 to 15% by weight and especially preferably from 8 to 12% by weight from the viewpoints of a high optical density, a good storage stability and a reduced viscosity of the water-based ink.

Meanwhile, in the present invention, the other colorants may also be used unless the objects and effects of the present invention are adversely affected. Examples of the other colorants include organic pigments other than PY74 (A), inorganic pigments, and hydrophobic dyes.

The content of the polymer (water-insoluble polymer (x)+water-soluble polymer (y)) in the water-based ink according to the present invention is preferably from 0.5 to 6% by weight, more preferably from 1 to 5% by weight and still more preferably from 1 to 4% by weight from the viewpoint of enhancing an optical density and a storage stability of the water-based ink.

The content of water in the water-based ink according to the present invention is preferably from 30 to 80% by weight, more preferably from 40 to 70% by weight and still more preferably from 50 to 65% by weight.

The ink-jet printing method to which the water-based ink according to the present invention is applicable is not particularly limited. However, the water-based ink of the present invention is more suitably applied to a piezoelectric-type ink-jet printer because the ink-jet printer is suitable for injecting a dispersion containing a dispersible colorant such as the pigment mixture and the polymer particles, etc.

EXAMPLES

In the following Production Examples, Examples and Comparative Examples, the "part(s)" and "%" indicate "part(s) by weight" and "% by weight", respectively, unless otherwise specified. Meanwhile, the content of sulfur in the pigment mixture, the weight-average molecular weight of the respective polymers, the average particle size, the viscosity and the like were measured and evaluated by the following methods.

(1) Method of Measuring Content of Sulfur in Pigment Mixture

The content of sulfur in the pigment mixture was measured using a combustion ion chromatograph available from Mitsubishi Chemical Analytech Co., Ltd.

(2) Weight-Average Molecular Weight of Polymer

The weight-average molecular weight of the polymer was measured by gel chromatographic method [GPC apparatus: "HLC-8120GPC" available from Tosoh Corp.; column: "TSK-GEL, α-M"×2 available from Tosoh Corp.; flow rate: 1 mL/min)] using N,N-dimethyl formamide containing 60 mmol/L of phosphoric acid and 50 mmol/L of lithium bromide as a solvent and using a polystyrene as a reference standard substance.

(3) Water-Insoluble/Water-Soluble Ratio of Polymer (i) In Case of Water-Soluble Polymer:

Pure water was added to an aqueous solution of a water-soluble polymer ("JONCRYL 61J"; (a) acrylic acid/(b) styrene=25/75 (weight ratio); available from BASF Japan Ltd.; weight-average molecular weight: 16000; ammonia-100% neutralized product) to prepare a polymer solution having a polymer concentration of 10% by weight. The polymer was completely dissolved in the polymer solution.

(ii) In Case of Water-Insoluble Polymer:

A 5N sodium hydroxide aqueous solution was added to a methyl ethyl ketone solution of the water-insoluble polymer obtained in Production Example 1 to neutralize 100% of the polymer, and 10 g of the neutralized polymer in terms of the pure polymer content were weighed and sampled. The thus obtained neutralized polymer was added dropwise to pure water, and methyl ethyl ketone and a part of water were removed therefrom using a rotary evaporator to obtain a dispersion having a polymer concentration of 10% by weight. The thus obtained dispersion was subjected under the same conditions as used in the above (i) to centrifugal separation (using a table top centrifuge "2100" available from Kubota Corp.; rotating speed: 4000 r/m; time: 20 min; temperature: 20° C.) to thereby separate the polymer in the dispersion into a precipitated component as a water-insoluble polymer (x-2) and a dissolved component as a water-soluble polymer (y-2). The ratio of the water-insoluble polymer (x-2) to the water-soluble polymer (y-2) [water-insoluble polymer (x-2)/water-soluble polymer (y-2)] was 100/0 as calculated by counting fractions of 0.5 and over as a unit and cutting away the rest.

(4) Measurement of Average Primary Particle Size of Pigment Mixture

The major axis diameters of 100 particles of the pigment mixture were measured using a transmission electron microscope (TEM).

(5) Measurement of Viscosity

The viscosity of the water-based ink (solid content: 10% by weight) was measured at 20° C. for 1 min using an E-type viscometer "Model No. RE80 Type" available from Toki Sangyo Co., Ltd., equipped with a standard rotor (1°34'×R24) at a rotating speed of 100 rpm.

(6) Storage Stability

A screw tube was filled with a water dispersion of pigment mixture-containing (crosslinked) polymer particles having a solid content of 30% or a water-based ink and hermetically sealed, and the thus filled tube was preserved in a constant temperature oven at 70° C. for one week. The viscosity of the water dispersion or the water-based ink before and after preserved was measured by the method described in the above (5) to determine a rate of change in the viscosity (%) according to the following calculation formula and thereby evaluate a storage stability of the water dispersion or the water-based ink.

Rate of Change in Viscosity (%)=100−{[viscosity after preserved]/[viscosity before preserved]}× 100

(Evaluation Criteria)

A: Rate of change in viscosity was within the range of ±10%.

B: Rate of change in viscosity was out of the range of ±10% but within the range of 115%.

C: Rate of change in viscosity was out of the range of ±15%.

(7) Evaluation of Optical Density

Solid image printing with the respective water-based inks obtained in Examples, etc., was carried out on a commercially available plain paper ("XEROX 4200" (tradename) available from Xerox Corp.) using a printer "Model No. EM-930C" (tradename; piezoelectric-type) available from Seiko Epson Corp., under the following printing conditions:

Kind of Paper: Plain paper;
Mode set: Fine; and
Frequency of Printing: One time.

After allowing the printed paper to stand at 25° C. for 24 h, the optical density values of the resulting print (5.1 cm×8.0 cm) were measured at total 5 points including a central portion and four corners of the paper using a Macbeth densitometer (product number: "SPECTROEYE" available from GretagMacbeth GmbH) to calculate an average value thereof.

(8) Change in Absorption Characteristics

The water-based ink used for evaluation of storage stability in the above (6) was diluted 10,000 times with water, and the absorption spectrum of the resulting dilute solution was measured at a wavelength range of from 400 to 600 nm using a spectrophotometer "Model U-3010" available from Hitachi Ltd. The amount of change in maximum absorption wavelength of the absorption spectrum between before and after preserved for one week at 70° C. was calculated to evaluate the change in absorption characteristics of the water-based ink according to the following evaluation criteria.

(Evaluation Criteria)

A: Change in maximum absorption wavelength was not more than 0.1 nm.

B: Change in maximum absorption wavelength was more than 0.1 nm and not more than 2 nm.

C: Change in maximum absorption wavelength was more than 2 nm.

Production Example 1

Production of Water-Insoluble Polymer

Twenty parts of MEK (methyl ethyl ketone) and 0.03 part of a chain transfer agent (2-mercaptoethanol) as well as 10% of 200 parts of a monomer mixture shown in Table 1 were charged into a reaction vessel and mixed with each other, and then an inside atmosphere of the reaction vessel was fully replaced with a nitrogen gas to thereby obtain a mixed solution.

Separately, remaining 90% of the monomer mixture shown in Table 1 was charged into a dropping funnel, and further 0.27 part of the chain transfer agent, 60 parts of MEK and 1.2 parts of a radical polymerization initiator (2,2'-azobis(2,4-dimethylvaleronitrile)) were added thereto and mixed with each other, and an inside atmosphere of the dropping funnel was fully replaced with a nitrogen gas to thereby obtain a mixed solution.

The mixed solution in the reaction vessel was heated to 65° C. while stirring in a nitrogen atmosphere, and then the mixed solution in the dropping funnel was gradually dropped thereinto over 3 h. After the elapse of 2 h from completion of the dropping while maintaining the resulting mixed solution at a temperature of 65° C., a solution prepared by dissolving 0.3 part of the radical polymerization initiator in 5 parts of MEK was added to the above mixed solution, and the resulting reaction solution was further aged at 65° C. for 2 h and at 70° C. for 2 h to obtain a solution of a vinyl-based water-insoluble polymer (polymer solid content: 40%). The weight-average molecular weight of the thus obtained polymer is shown in Table 1.

TABLE 1

| Monomer mixture (in terms of weight parts of solid components) | Production Example 1 |
|---|---|
| (a) Methacrylic acid | 21 |
| (b) Styrene monomer | 39 |
| (c) Styrene macromer | 10 |
| (d) Polypropylene glycol monomethacrylate | 15 |
| (d) Phenoxypolyethylene glycol-polypropylene glycol-methacrylate | 15 |
| Weight-average molecular weight of water-insoluble polymer produced | 100,000 |

Meanwhile, details of the respective monomers shown in Table 1 are as follows.

(c) Styrene macromer: "AS-6S" (tradename) available from Toagosei Co., Ltd.; number-average molecular weight: 6000; polymerizable functional group: methacryloyloxy group (d) Polypropylene glycol monomethacrylate (average molar number of addition of propyleneoxide: 13; "BLEMMER PP-800" (tradename) available from NOF Corporation.

(d) Phenoxypolyethylene glycol-polypropylene glycol-methacrylate (average molar number of addition of ethyleneoxide: 6; average molar number of addition of propyleneoxide: 6; "BLEMMER 43PAPE-600B" (tradename) available from NOF Corporation.

Production Example 2

Production of Pigment Mixture of PY74 (A) and Azo Compound (B-1)

(1) One hundred sixty eight parts (1 mol) of 2-methoxy-4-nitroaniline were dissolved in a solution containing 2000 parts of water and 260 parts of 35% hydrochloric acid, and then 1000 parts of ice were added to the resulting solution to cool the solution to 0° C. Then, a solution containing 200 parts of water and 70 parts of sodium nitrite was added to the thus cooled solution, and the resulting mixed solution was stirred at 3° C. or lower for 60 min to obtain a diazo component.

(2) On the other hand, 200 parts (0.966 mol) of 2-methoxyacetoacetanilide and 7.9 parts (0.019 mol) of the compound represented by the following formula (4) were dissolved in a solution containing 5000 parts of water and 10 parts of sodium hydroxide. To the resulting solution were slowly added 200 parts of 80% acetic acid to thereby prepare a suspension as a coupler component.

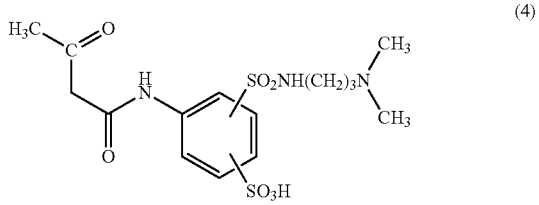

(4)

(3) The diazo component obtained in the above (1) was added to the coupler component obtained in the above (2) over 60 min. During the above coupling reaction, the reaction temperature was held at about 20° C. The thus obtained slurry of the pigment mixture as the reaction product was heated to 90° C. and held at that temperature for 30 min, and then successively subjected to filtration, washing with water, pressing and drying at 90° C. for 15 h, thereby obtaining 500 parts of a pigment mixture containing Pigment Yellow 74 (A) as a monoazo pigment and the azo compound (B-1) represented by the following formula (5). The resulting pigment mixture was pulverized to obtain pigment mixture particles.

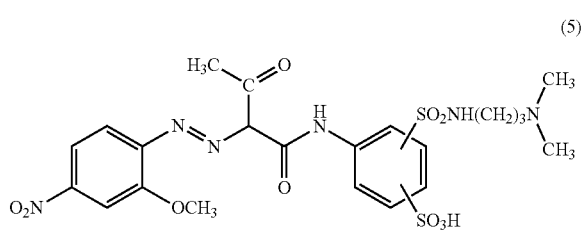

(5)

Example 1

(1) Preparation of Dispersion of Pigment Mixture-Containing Water-Insoluble Polymer Particles (Step (1))

Twenty five parts of the polymer produced by drying the solution of the water-insoluble polymer obtained in Production Example 1 under reduced pressure were mixed with 78.6 parts of MEK. Then, 100 parts of the pigment mixture obtained in Production Example 2(3) were added into the above obtained mixture, and then the resulting mixture was well mixed. Further, 7.0 parts of a 5N sodium hydroxide aqueous solution and 6.0 parts of a 25% ammonia aqueous solution (neutralization degree: 60%) were added to the mixture, and the obtained mixture was stirred at 20° C. for 60 min using a disper ("Ultra Disper": available from Asada Iron Works Co., Ltd.) while rotating a disper blade at 7000 rpm. The resulting mixture was diluted with ion-exchanged water to prepare a 20% aqueous solution. The thus prepared solution was further dispersed under a pressure of 200 MPa by passing through a disperser "MICROFLUIDIZER" (tradename) available from Microfluidics Corp., 10 times.

(2) Preparation of Water Dispersion of Pigment Mixture-Containing Water-Insoluble Polymer Particles (Step (2))

The dispersion obtained in the above (1) was mixed with 250 parts of ion-exchanged water and then stirred. Thereafter, MEK was completely removed from the resulting mixture under reduced pressure at 60° C., followed by removing a part of water therefrom. The obtained mixture was filtered through a 5 μm-mesh filter (acetyl cellulose membrane; outer diameter: 2.5 cm; available from Fujifilm Corp.) fitted to a 25 mL syringe without a needle (available from Terumo Corp.) to remove coarse particles therefrom, thereby obtaining a water dispersion of pigment mixture-containing vinyl-based polymer particles having a solid content of 30%.

(3) Preparation of Water Dispersion of Pigment Mixture-Containing Crosslinked Polymer Particles (Step (3))

Next, 0.33 part of a crosslinking agent ("DENACOL EX-321" (tradename) available from Nagase ChemteX Corp.; epoxy equivalent: 140; solubility in 100 parts of water: about 27 parts (at 25° C.)) and 0.77 part of water were added to 40 parts of the water dispersion obtained in the above (2) in such an amount that the crosslinking rate was 40 mol %, and the resultant mixture was stirred at 90° C. for 1.5 h in a hermetically sealed condition. After completion of the stirring, the obtained reaction mixture was cooled and then filtered through a 5.0 μm-mesh filter (acetyl cellulose membrane; outer diameter: 2.5 cm; available from Fujifilm Corp.), thereby obtaining a water dispersion of pigment mixture-containing crosslinked polymer particles having a solid content of 30% (solid content of pigment mixture: 24%).

(4) Preparation of Water-Based Ink

The following mixed solution was added to 41.7 parts of the thus obtained water dispersion (solid content of pigment mixture: 24%) to prepare a water-based ink in an amount of 10.0 parts in terms of a solid content of the pigment mixture.

More specifically, 2.0 parts of 1,2-hexanediol (available from Tokyo Chemical Industry Co., Ltd.), 2.0 parts of 2-pyrrolidone (available from Wako Pure Chemical Industries Ltd.), 2.0 parts of glycerol (available from Kao Corp.) and 10.0 parts of triethylene glycol monobutyl ether ("Butyl Triglycol" (tradename) available from Nippon Nyukazai Co., Ltd.) as water-soluble organic solvents, 0.5 part of "SURFYNOL 465" (available from Nissin Chemical Industry Co., Ltd.) and 0.5 part of "OLFINE E1010" (available from Nissin Chemical Industry Co., Ltd.) as nonionic surfactants, 0.3 part of "Ploxel XL2" (available from Avecia K.K.) as an antiseptic agent, and 41 parts of ion-exchanged water, were mixed with each other while stirring with a magnetic stirrer, and the resulting mixture was further stirred at room temperature for 5 min, thereby preparing a mixed solution.

Next, while stirring the previously prepared water dispersion with a magnetic stirrer, the above mixed solution was added thereto, and the resulting mixture was subjected to filtration through a 5 μm-mesh filter (cellulose acetate membrane; available from Sartorius K. K.), thereby obtaining a water-based ink.

Example 2

(1) Preparation of Water Dispersion Obtained by Dispersing Pigment Mixture with Water-Soluble Polymer (Step (I))

Added to 24.8 parts of a 31.85% aqueous solution of the water-soluble polymer ("JONCRYL 61J"; available from BASF Japan Ltd.; weight-average molecular weight: 12600) were 770.3 parts of ion-exchanged water, 8.15 parts of a 25% ammonia aqueous solution and 99.4 parts of MEK, thereby obtaining an aqueous solution of the water-soluble polymer.

Added to the resulting aqueous solution of the water-soluble polymer were 150 parts of the pigment mixture obtained in Production Example 2(3), and the resulting mixture was mixed using a disper blade at 20° C. for 1 h, and then 526 parts of ion-exchanged water were added thereto, thereby obtaining a preliminary dispersion.

Next, 1580 parts of the thus obtained preliminary dispersion were subjected to dispersing treatment by a circulating method using a beads mill type disperser ("Ultra Apex Mill UAM-05" (tradename) available from Kotobuki Industries Co., Ltd.) filled with zirconia beads having a particle size of 0.05 mm as media particles under the conditions including a beads filling rate of 85% by volume, an agitation blade peripheral speed of 8 m/s and a circulating flow rate of 200 cc/min for 24 min (total average retention time in the mill: 3.75 min) to obtain a water dispersion in which the pigment mixture was dispersed with the water-soluble polymer.

(2) Preparation of Water Dispersion Obtained by Dispersing Pigment Mixture with Water-Insoluble Polymer and Water-Soluble Polymer (Step (II))

Next, 5.88 parts of MEK were added to 75.80 parts of the solution of the water-insoluble polymer obtained in Production Example 1, and then 10.3 parts of a 5N sodium hydroxide aqueous solution and 107.2 parts of ion-exchanged water were added to the resulting mixture. Successively, the thus obtained mixture was mixed using a stirrer to prepare an emulsion of the water-insoluble polymer.

While mixing the water dispersion obtained in the above (1) in which the pigment mixture was dispersed with the water-soluble polymer using a stirrer, the emulsion of the water-insoluble polymer obtained above was added thereto, thereby obtaining a mixture. The thus obtained mixture was subjected to dispersing treatment using a high-pressure homogenizer ("MICROFLUIDIZER" (tradename) available from Microfluidics Corp.; pressure: 150 MPa; by continuous 5 pass method), thereby obtaining a dispersion.

The dispersion obtained in the above was heated with a warm water bath under reduced pressure to remove MEK and a part of water therefrom. The resulting dispersion was filtered through a 5 μm-mesh filter (acetyl cellulose membrane; outer diameter: 2.5 cm; available from Fujifilm Corp.) fitted to a 25 mL syringe without a needle (available from Terumo Corp.) to remove coarse particles therefrom, thereby obtaining a water dispersion having a solid content of 30%.

(3) Preparation of Water Dispersion of Pigment Mixture-Containing Crosslinked Polymer Particles (Step (III))

Next, 0.445 part of a crosslinking agent ("DENACOL EX-321L" (tradename) available from Nagase ChemteX Corp.; epoxy equivalent: 129; solubility in 100 parts of water: about 27 parts (at 25° C.)) were added to 40 parts of the thus obtained water dispersion having a solid content of 30% in such an amount that the crosslinking rate was 54 mol %, and the resultant mixture was stirred at 90° C. for 1 h. After completion of the stirring, the obtained reaction mixture was cooled and then filtered through a 5.0 μm-mesh filter (acetyl cellulose membrane; outer diameter: 2.5 cm; available from Fujifilm Corp.), thereby obtaining a water dispersion of pigment mixture-containing crosslinked polymer particles having a solid content of 30% (solid content of pigment mixture: 24%).

(4) Preparation of Water-Based Ink

The water dispersion obtained above was subjected to the same procedure as in Example 1(4) to thereby obtain a water-based ink.

Comparative Example 1

The same procedures as in Production Example 2 and Example 1 were repeated except that 7.9 parts of the compound represented by the above formula (4) as used in Production Example 2(1) was replaced with 6.6 parts (0.029 mol) of the compound represented by the following formula (6), thereby obtaining a water dispersion of crosslinked polymer particles containing a pigment mixture of Pigment Yellow 74 (A) and the azo compound (B-2) represented by the following formula (7), and a water-based ink.

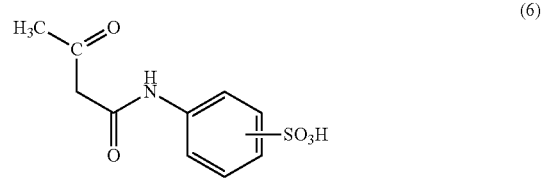

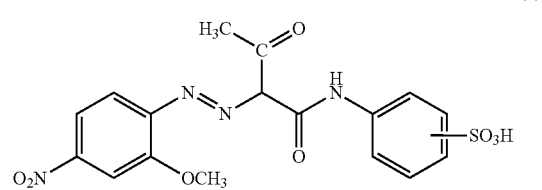

Comparative Example 2

The same procedure as in Production Example 2(1) was repeated except that the amount of 2-methoxy-4-nitroaniline used was changed from 168 parts to 164 parts (0.976 mol), and the compound represented by the following formula (8) was used in an amount of 8.9 parts (0.019 mol), thereby obtaining a diazo component.

The same procedure as in Production Example 2(2) was repeated except that 7.9 parts of the compound represented by the above formula (4) was not used, and the amount of 2-methoxyacetoacetanilide used was changed from 200 parts to 208 parts (1 mol), thereby obtaining a pigment mixture containing Pigment Yellow 74 (A) and a Pigment Yellow 74 derivative (B-3) as the compound represented by the following formula (9).

Next, a water dispersion of the pigment mixture-containing crosslinked polymer and a water-based ink were produced in the same manner as in Example 1.

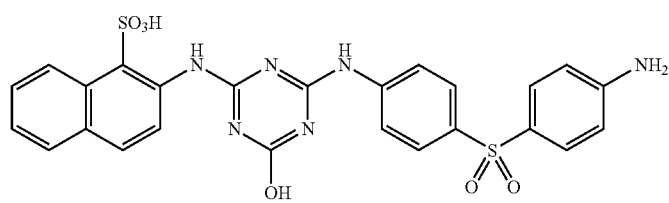

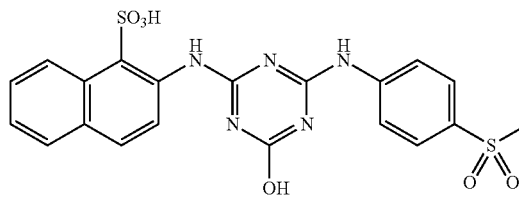
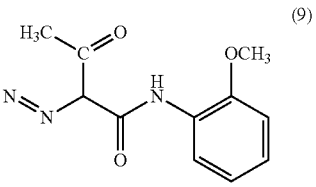

TABLE 2

|  | Examples | | Comparative Examples | |
|---|---|---|---|---|
|  | 1 | 2 | 1 | 2 |
| Pigment mixture | | | | |
| Pigment (A) | PY74 | PY74 | PY74 | PY74 |
| PY 74 derivative (B) | | | | |
| Kind | B-1; formula (5) | B-1; formula (5) | B-2; formula (7) | B-3; formula (9) |
| Sulfonic acid group | Present | Present | Present | Present |
| Sulfonamide group | Present | Present | None | None |
| Content of sulfur (%) | 0.35 | 0.35 | 0.22 | 0.24 |
| Average primary particle size (nm) | 30 | 30 | 60 | 60 |
| Water dispersion | | | | |
| Pigment mixture (%) | 24 | 24 | 24 | 24 |
| Water-insoluble polymer (%) | 6 | 4.8 | 6 | 6 |
| Water-soluble polymer (%) | — | 1.2 | — | — |
| Evaluation results | | | | |
| Storage stability | A | A | B | B |
| Water-based ink | | | | |
| Pigment mixture (%) | 10 | 10 | 10 | 10 |
| Water-insoluble polymer (%) | 2.5 | 2 | 2.5 | 2.5 |
| Water-soluble polymer (%) | — | 0.5 | — | — |
| Evaluation results | | | | |
| Storage stability | A | B | X | X |
| Viscosity (before preserved) | 4.2 | 3.7 | 4.7 | 4.9 |
| Optical density | 1.15 | 1.15 | 1.09 | 1.09 |
| Change in absorption characteristics | B | A | C | C |

From Table 2, it was confirmed that the water dispersions and water-based inks obtained in Examples 1 and 2 were more excellent in optical density and storage stability even when subjected to high-speed printing as compared to the water dispersions and water-based inks obtained in Comparative Examples 1 and 2.

INDUSTRIAL APPLICABILITY

In accordance with the present invention, there can be provided a water dispersion and a water-based ink for ink-jet printing which exhibit a high optical density adaptable for high-speed printing and an excellent storage stability, are capable of reducing a viscosity of the resulting ink, and have a less change in absorption characteristics.

The invention claimed is:

1. A water dispersion for ink-jet printing comprising a polymer and a pigment mixture of C.I. Pigment Yellow 74 (A) and an azo compound (B) represented by the following formula (1) which is dispersed with the polymer, wherein a total pigment solid content of the components (A) and (B) in the water dispersion is from 15 to 35% by weight,

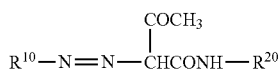

wherein $R^{10}$ and $R^{20}$ are each independently an aryl group which may have a substituent group selected from the group consisting of a methoxy group and a nitro group with the proviso that at least one of $R^{10}$ and $R^{20}$ has a sulfonic acid group and a sulfonic acid amide group.

2. The water dispersion for ink-jet printing according to claim 1, wherein the azo compound (B) is represented by the following formula (3),

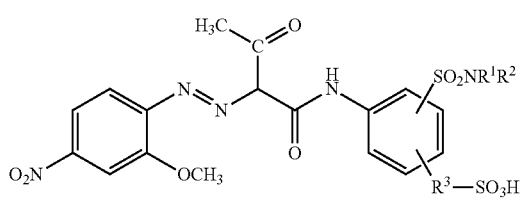

wherein $R^1$ and $R^2$ are each independently a hydrogen atom or an alkyl group or aminoalkyl group having 1 to 12 carbon atoms which may have a substituent group; and $R^3$ is a single bond, a methylene group or an ethylene group.

3. The water dispersion for ink-jet printing according to claim 2, wherein in the formula (3), $R^{10}$ and $R^2$ are each independently an N-alkyl ($C_1$ to $C_3$)-aminopropyl group or an N,N-dialkyl ($C_1$ to $C_3$)-aminopropyl group.

4. The water dispersion for ink-jet printing according to claim 1, wherein a content of sulfur in the pigment mixture is from 0.25 to 0.7% by weight.

5. The water dispersion for ink-jet printing according to claim 1, wherein the polymer contains a water-insoluble polymer (x).

6. The water dispersion for ink-jet printing according to claim 5, wherein the water-insoluble polymer (x) is a vinyl polymer obtained by copolymerizing a monomer mixture comprising (a) a salt-forming group-containing monomer and (b) a hydrophobic monomer, and the hydrophobic monomer (b) is styrene and/or benzyl (meth)acrylate.

7. The water dispersion for ink-jet printing according to claim 6, wherein the water-insoluble polymer (x) is a vinyl polymer obtained by further copolymerizing a styrene-based macromer with the monomer mixture.

8. The water dispersion for ink et printing according to claim 1, wherein the polymer contains a water-insoluble polymer (x) and a water-soluble polymer (y).

9. The water dispersion for ink jet printing according to claim 7, wherein the water-soluble polymer (y) is a vinyl polymer obtained by copolymerizing a monomer mixture comprising (a) a salt-forming group-containing monomer and (b) a hydrophobic monomer, and the hydrophobic monomer (b) is styrene and/or benzyl (meth)acrylate.

10. The water dispersion for ink-jet printing according to claim 8, wherein the styrene and/or benzyl (meth)acrylate is contained in an amount of from 50 to 80% by weight on the basis of whole monomers in the monomer mixture.

11. The water dispersion for ink-jet printing according to claim 8, wherein a weight ratio of the pigment mixture to a sum of the water-insoluble polymer (x) and the water-soluble polymer (y) [(x)+(y)] {pigment mixture/[(x)+(y)]} is from 70/30 to 95/5.

12. The water dispersion for ink-jet printing according to claim 8, wherein a weight ratio of the water-insoluble polymer (x) to the water-soluble polymer (y) [(x)/(y)] is from 3.0 to 4.0.

13. The water dispersion for ink jet printing according to claim 1, wherein the polymer is a crosslinked polymer obtained by crosslinking the polymer with a crosslinking agent.

14. The water dispersion for ink-jet printing according to claim 1, wherein the pigment mixture is incorporated into the polymer and allowed to be present in the form of polymer particles.

15. The water dispersion for ink-jet printing according to claim 1, wherein the pigment mixture has an average primary particle size of from 10 to 50 nm.

16. A process for producing the water dispersion for ink-jet printing as defined in claim 5, comprising the following steps (1) and (2):
   Step (1): dispersing a mixture containing the water-insoluble polymer (x), an organic solvent, the pigment mixture and water to obtain a dispersion of pigment mixture-containing water-insoluble polymer (x) particles; and
   Step (2): removing the organic solvent from the dispersion obtained in the step (1) to obtain a water dispersion of the pigment mixture-containing water-insoluble polymer (x) particles.

17. A process for producing the water dispersion for ink-jet printing as defined in claim 8, comprising the following steps (I) and (II):
   Step (I): dispersing the pigment mixture in the water-soluble polymer (y) and water to obtain a water dispersion; and
   Step (II): adding the water-insoluble polymer (x) to the water dispersion obtained in the step (I) to further disperse the water-insoluble polymer (x) therein to thereby obtain a dispersion of pigment mixture-containing polymer particles (A).

18. The process for producing the water dispersion for ink-jet printing according to claim 17, wherein the dispersion procedure in the step (II) is carried out using a high-pressure homogenizer.

19. A water-based ink for ink jet printing comprising a polymer and a pigment mixture of C.I. Pigment Yellow 74 (A) and an azo compound (B) represented by the following formula (1) which is dispersed with the polymer, wherein a total pigment solid content of the components (A) and (B) in the water-based ink is from 3 to 20% by weight,

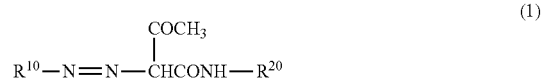

(1)

wherein $R^{10}$ and $R^{20}$ are each independently an aryl group which may have a substituent group selected from the group consisting of a methoxy group and a nitro group with the proviso that at least one of $R^{10}$ and $R^{20}$ has a sulfonic acid group and a sulfonic acid amide group.

20. A method of ink-jet printing, comprising the step of:
   projecting droplets of ink onto a recording medium;
   wherein the ink is a water dispersion or a water-based ink comprising polymer particles comprising a pigment mixture of C.I. Pigment Yellow 74 (A) and an azo compound (B) represented by the following formula (1) wherein a total pigment solid content of the components (A) and (B) in the polymer particles is from 15 to 35% by weight,

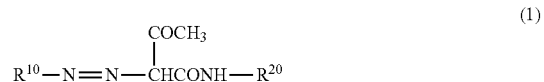

(1)

wherein $R^{10}$ and $R^{20}$ are each independently an aryl group which may have a substituent group selected from the group consisting of a methoxy group and a nitro group with the proviso that at least one of $R^{10}$ and $R^{20}$ has a sulfonic acid group and a sulfonic acid amide group.

* * * * *